United States Patent

King, Jr.

[15] 3,679,109

[45] July 25, 1972

[54] METHOD AND APPARATUS FOR SEVERING TUBING

[72] Inventor: John O. King, Jr., 3990 N. Ivy Rd., Atlanta, Ga. 30305

[22] Filed: Dec. 4, 1969

[21] Appl. No.: 882,126

Related U.S. Application Data

[63] Continuation-in-part of Ser. No. 711,368, March 7, 1968, abandoned.

[52] U.S. Cl. ...................225/2, 33/174 R, 225/96.5, 225/103
[51] Int. Cl. ...................................................B26f 3/00
[58] Field of Search...................225/2, 96.5, 103; 33/180 R, 33/185 R, 174 H, 174 R; 29/413

[56] References Cited

UNITED STATES PATENTS

| | | | |
|---|---|---|---|
| 2,742,965 | 4/1956 | Drummond, Jr. | 225/103 |
| 2,839,871 | 6/1958 | Austin | 225/96.5 |
| 3,138,308 | 6/1964 | Oakley | 225/96.5 X |
| 3,190,094 | 6/1965 | Kutas | 225/103 X |
| 3,567,088 | 3/1971 | Andersen | 225/103 |

Primary Examiner—Frank T. Yost
Attorney—B. J. Powell

[57] ABSTRACT

Method and apparatus for severing thin walled tubing into selected lengths wherein the method includes circumferentially scoring the outside of the tubing at a predetermined point to produce a narrow weakened portion therearound and subsequently supporting the tubing internally while applying separating forces to the inside of the tubing at the weakened portion to sever the tubing at the weakened portion. The apparatus includes means for selectively measuring the length of the tubing to be severed and means for supporting the tubing internally while applying separation forces to the inside thereof at a circumferentially extending weakened portion to cause the same to sever at the weakened portion. The apparatus also includes means for producing a circumferentially extending weakened portion in the tubing.

16 Claims, 22 Drawing Figures

INVENTOR
JOHN O. KING, JR.

BY: Newton, Hopkins, & Ormsby
ATTORNEYS

METHOD AND APPARATUS FOR SEVERING TUBING

CROSS REFERENCE TO RELATED APPLICATION

This application is a continuation-in-part of my copending application Ser. No. 711,368, filed Mar. 7, 1968, for "Fastener Adapter and Method", now abandoned.

BACKGROUND OF THE INVENTION

1. Field of the Invention

This invention relates generally to the severing of thin walled tubing and more particularly to the severing of thin walled tubing by producing a circumferentially extending narrow weakened portion therearound and subsequently applying separation forces to the inside of the tubing to cause the tubing to sever along the weakened portion.

2. Discussion of the Prior Art

Tubing has frequently been cut to length by circumferentially scribing the outside thereof until the tubing was severed. With very thin walled tubing, however, this technique was inadequate since this tubing collapsed or otherwise distorted under the force of the cutting tool.

SUMMARY OF THE INVENTION

These and other problems and disadvantages associated with the prior art are overcome by the invention described herein in that very thin walled tubing can be severed without detrimentally distorting the tubing. The technique employed by the invention includes forming a narrow circumferentially extending weakened portion around the tubing and subsequently supporting the tubing adjacent the weakened portion while separation forces are applied to the weakened portion to cause the tubing to sever along the weakened portion.

When the thin walled tubing is in the form of a fastener adapter as described in patent application Ser. No. 711,368, filed Mar. 7, 1968, for "Fastener Adapter and Method," the technique of the invention includes measuring the length of the bearing area of the fastener to which the adapter is to be applied and subsequently internally supporting that portion of the length of the adapter corresponding to the length of the bearing area of the fastener. The adapter may have preformed circumferentially extending weakened portions therein. In this instance the remainder of the adapter is internally supported by a separate member and the support members are pivoted with respect to each other to apply separation forces to the adapter from the inside thereof at the nearest weakened portion to the junction of the support members and sever the adapter at this weakened portion.

On the other hand, if the adapter does not have weakened portions therearound, and remainder of the adapter is internally supported while a scoring tool is first applied to the adapter at the junction of the support members to produce a weakened portion therearound and then the support members are pivoted to cause the adapter to sever at the weakened portion.

The apparatus of the invention includes a combination primary support and measuring tool for selectively internally supporting a portion of thin walled tubing corresponding in length to the bearing area of a fastener, and a secondary tool for selectively internally supporting the remainder of the tubing so as to generate separation forces from the inside of the tubing to sever same at a narrow weakened portion circumferentially extending around the tubing. The secondary tool may also include means for forming a circumferentially extending narrow weakened portion around the tubing at the junction of the internal supports of the primary and secondary tools.

These and other features and advantages of the invention disclosed herein will be more clearly understood upon consideration of the following detailed description and accompanying drawings wherein like characters of reference designate corresponding parts throughout the several views and in which:

Figure 1:
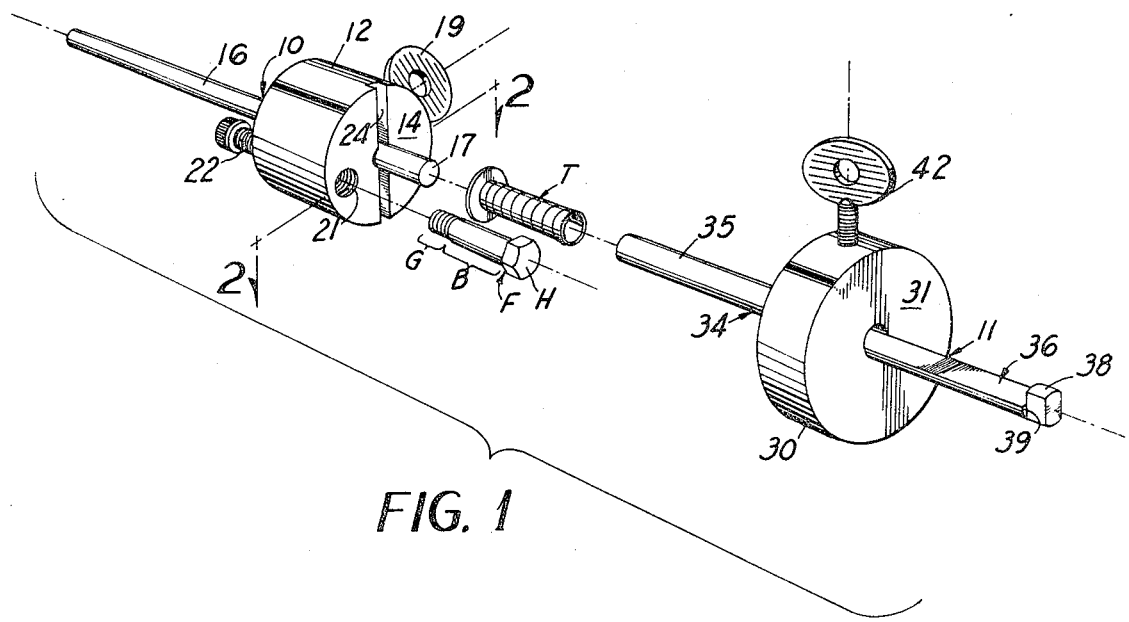
Fig. 1 is an exploded perspective view of one embodiment of the invention.

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Referring to FIGS. 1 – 5 it will be seen that the apparatus of the invention includes generally a primary support and measuring tool 10 and a secondary tool 11. The tool 10 is used to adjust the length of tubing T to that of the bearing area of a fastener F and internally support the tubing T while the tool 11 is inserted in the tubing and severs same in conjunction with tool 10.

The tool 10 includes a stop member 12 defining a bearing surface 14 on one end thereof. A centrally located passage 15 is defined through member 12. Passage 15 opens onto surface 14 and its axis is perpendicular to the surface 14. A support member 16 is slidably received through passage 15 and extends out over surface 14. A threaded aperture 18 in member 12 connects with passage 15 and threadedly receives therein a lock screw 19. A plastic follower 20 is placed in aperture 18 between the lock screw 19 and support member 16 so that as the screw 19 is tightened, the support member 16 will be locked in position.

Figure 2:
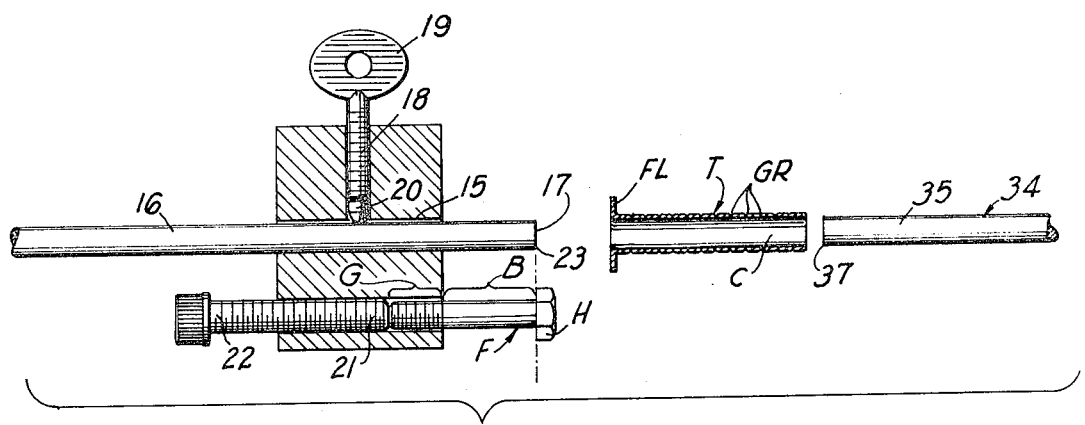
FIG. 2 is a cross-sectional view taken along line 2 — 2 in FIG. 1 showing the use of the invention on an exposed head fastener.
Figures 4, 5:
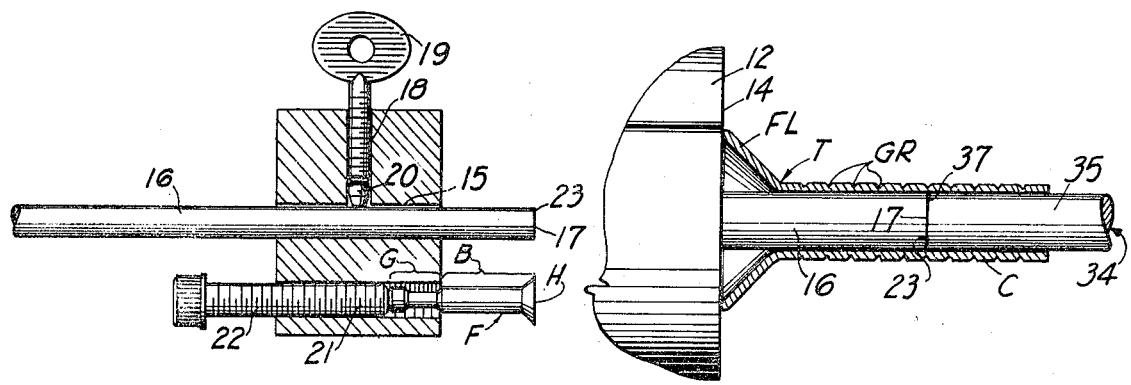
FIG. 4 is a cross-sectional view taken as FIG. 2 and showing the use of the invention on a countersunk head fastener.
FIG. 5 is an enlarged portion of FIG. 4 showing a thin walled fastener adapter inserted thereon.

Stop member 12 also defines a threaded passage 21 therethrough which opens onto surface 14 and is parallel to passage 15 but displaced laterally therefrom. A positioning screw 22 is threadedly received in passage 21 from that side of stop member 12 opposite surface 14 to selectively position a fastener F within passage 21. The passage 21 is sufficiently large for a fastener F to be freely received therein as illustrated in FIGS. 2 and 4.

The tubing T shown in FIGS. 1 – 5 is in the form of a gastener adapter having a cylindrical portion C and a flange portion FL. The cylindrical portion C may be plain or circumferentially grooved as at GR with narrow grooves that extend around the outside of the portion C in a plane perpendicular to the axis of the tubing T. These grooves extend partially through the wall of the portion C and may be spaced along the length of the tubing at predetermined intervals. Of course, the inside diameter of the tubing T would be such that the bearing area B of the fastener F would be snugly received therein. The diameter and external configuration of the support member 16 is such that it will snugly fit within the tubing T.

Referring to FIGS. 1 and 6 – 8, the secondary support tool includes a check member 30 having a measuring surface 31 and a passage 32 therethrough which opens onto the surface 31 and has its axis perpendicular to the surface 31. A secondary support pin 34 is slidably received through the passage 32 and has a support portion 35 at one end thereof with an external configuration conforming to the inside of the cylindrical portion C of the tubing T. The other end thereof has a longitudinally extending recess 36 therein with a lug 38 left at the extreme end thereof. Opposite sides of the lug 38 are cut away perpendicular to the bottom of recess 36 so as to form shoulders 39 on opposite sides of recess 36.

A threaded aperture 40 in check member 30 connects with passage 32 so that when a plastic follower pin 41 is inserted in aperture 40 and driven into recess 36 in pin 34 by lock screw 42, the pin 34 can be selectively locked into position at any desired point. The follower pin 41 extending into recess 36 serves to retain pin 34 within passage 32.

Figure 3:
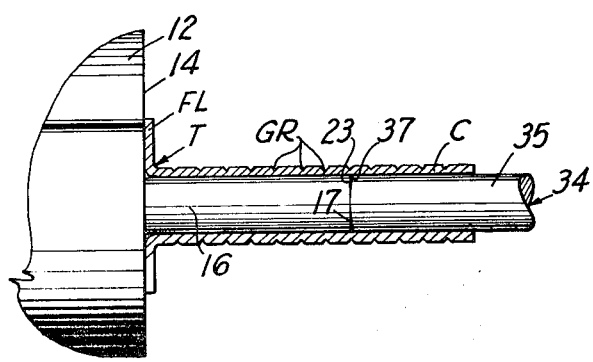
FIG. 3 is an enlarged portion of FIG. 2 showing a thin walled fastener adapter inserted thereon.

With the tools 10 and 11, the length of tubing T to be used in a particular application can be determined whether the length of the bearing area B of the fastener F is known or not. If the bearing area B of the fastener F is known, then the fastener F is positioned in the passage 21 with its gripping end G first as seen in FIG. 2. The screw 2 is adjusted until the junction between the gripping area G and bearing area B is in line with surface 14. This is shown in FIGS. 2 and 4. The bearing area B and head H are now exposed over the surface 14. The support member 16 is then slidably moved along passage 15 until the extending end 17 is in alignment with the end of the bearing area B adjacent the head H. It will be noted that this will be the bottom of the head H for an exposed head fastener as seen in FIG. 2 and the top of head H for a countersunk head fastener as seen in FIG. 4. The fastener F is then removed and the tubing T is inserted over the end 17 of member 16 with the flange F toward the surface 14 as seen in FIGS. 3 and 5.

Figures 6, 7:
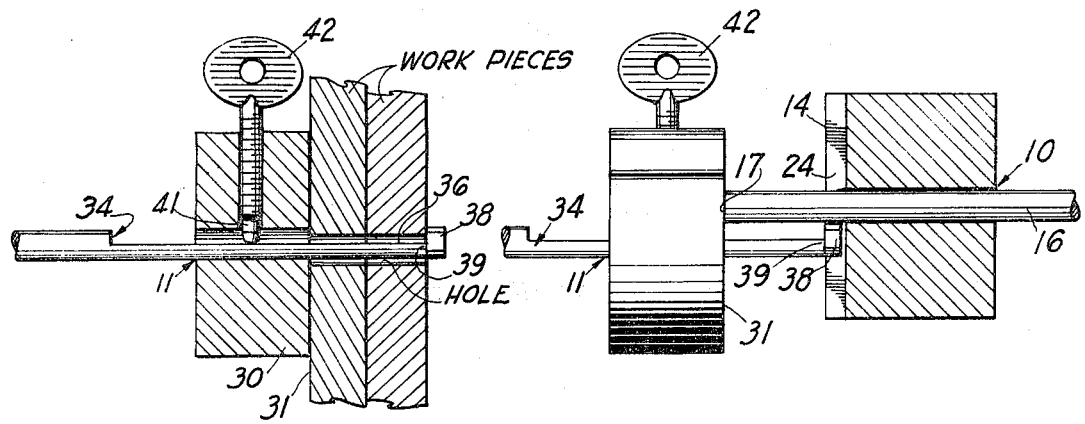
FIG. 6 is a view showing the use of the secondary tool in measuring the bearing length of tubing for work pieces.
FIG. 7 is a view showing the use of the secondary tool in adjusting the primary tool.

If the bearing area B is not known, then the measuring end of the pin 34 is inserted through the hole in the work pieces into which a fastener is to be placed until the measuring surface of the check member 30 bears against the workpieces as seen in FIG. 6. The tab 38 lies against the opposite side of the work pieces. The lock screw 42 is then tightened to lock the pin 34 in position and the tool 11 removed. Thus, the distance between tab 38 and measuring surface 31 is the correct length of the bearing area B of the fastener to be used in this application.

Figure 8:
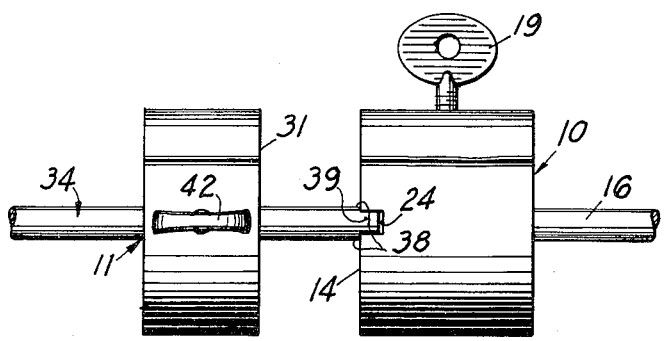
FIG. 8 is another view showing the use of the secondary tool in adjusting the primary tool.

The tool 11 is then positioned so that the tab 38 extends into slot 24 across the surface 14 as seen in FIGS. 1, 7 and 8. The support member 16 is then extended until it abuts surface 31 and locked in position. Tool 11 is then removed and the tubing T inserted flange end first over the support member 16.

Figure 9:
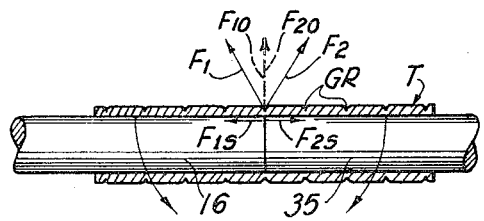
FIG. 9 – 12 schematically illustrate the severing of thin walled tubing with the invention.
Figure 10:
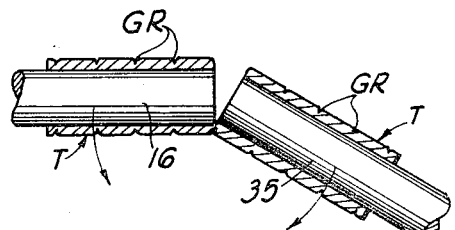
Figure 11:
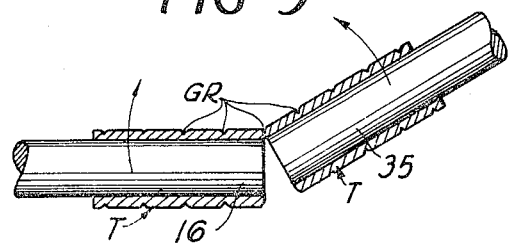
Figure 12:
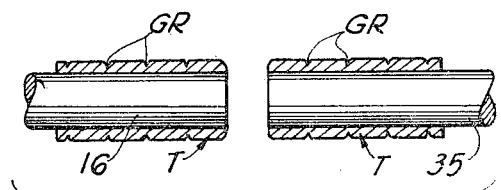
Figure 13:
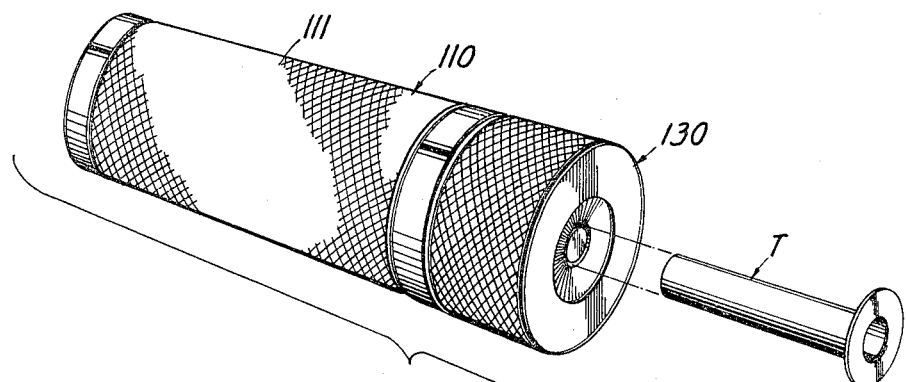
FIG. 13 is a perspective view of a combined secondary support and scoring tool of the invention.

Once the tubing T is inserted over the support member 16, it is ready for severing to length. If the tubing T is grooved at GR as shown in FIGS. 1 – 12, then the support portion 35 of tool 11 is inserted from the open end of the tubing T on the support member 16 as seen in FIGS. 3 and 5. It will be noted that the shoulder 23 on the end of member 16 and the shoulder 37 on the end of portion 35 are not rounded but are right angles between the outside and end surfaces of the member 16 and portion 35. Also, the pin 34 and member 16 lie along a common axis. The tools 10 and 11 are then grasped and forced to pivot as seen in FIGS. 9 and 10. Since the juxtaposed ends of the tools 10 and 11 are substantially in alignment with one of the grooves GR in the tubing T, the forcing of the tools to pivot about these ends causes two forces $F_1$ and $F_2$ to be generated at portions of the groove GR as illustrated in FIG. 9. Each of the forces $F_1$ and $F_2$ have an outwardly directed component $F_{10}$ and $F_{20}$ respectively as well as oppositely directed separation components $F_{1S}$ and $F_{2S}$ respectively. The forces $F_1$ and $F_2$ generated cause the tubing T to sever along the groove GR as shown in FIG. 10. The tools 10 and 11 are then pivoted the opposite direction as shown in FIG. 11 to cause the tubing T to be completely severed as shown in FIG. 12. This leaves a smooth end on the length of tubing T to be used.

When the tubing T is not grooved, the length of the tubing to be used is measured and supported on the support member 16 as previously described. Instead of using the tool 11 to sever the tubing to length, however, a tool 110 is used as seen in FIGS. 13 - 16.

Figure 14:
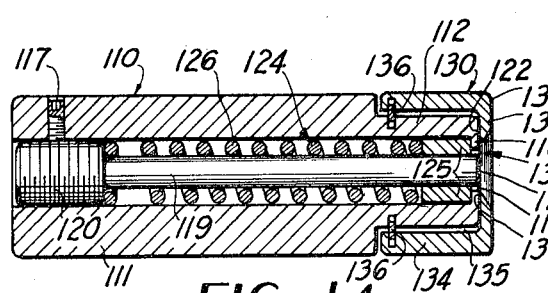
FIG. 14 is a longitudinal cross sectional view of the tool of FIG. 13.

As best seen in FIG. 14, the tool 110 includes a cylindrical housing 111 having a reduced diameter portion 112 at one end thereof. A first centrally located longitudinally extending passage 114 extends inwardly from that end of the housing 111 at the reduced diameter portion 112 and has a diameter conforming to the outside diameter of the tubing T for the tubing to be slidably received therein. The passage 114 joins with a concentrically located chamber 115 that extends a major portion of the length of housing 111 and has a diameter larger than passage 114 to define an inwardly directed lip 116 about passage 114. The chamber 115 connects with a threaded aperture 118 opening onto the opposite end of housing 111.

A support pin 119 having a threaded stud 120 thereon is centrally received through aperture 118, chamber 115 and passage 114 so that the stud 120 is threadedly received in aperture 118 as seen in FIG. 14. Pin 119 is adjusted within tool 110 until its extending end 121 is flush with the end surface 122 of the housing 111 adjacent passage 114. Since the diameter of pin 119 conforms to the inside shape of tubing T, a piece of tubing can be slid along pin 119 through passage 114 so that the pin 119 supports the inside of the tubing while the lip 116 supports the outside thereof. A set screw 117 is threadedly received in housing 111 to selectively engage the threaded stud 120 to lock the pin 119 in position.

Figure 16:
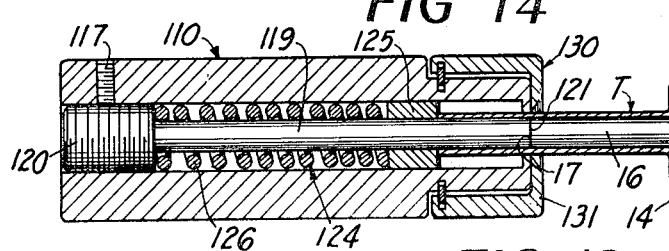
FIG. 16 is a view as shown in FIG. 14 illustrating the tool in use with the primary support and measuring tool.

An ejector mechanism 124 is carried by pin 119 in chamber 115 for automatically ejecting the tubing from the tool 110. The mechanism 124 includes a bushing 125 slidably received on pin 119 and a spring 126 between the bushing and that end of chamber opposite passage 114 so that bushing 125 is constantly urged toward passage 114. The lip 116 serves to arrest the outward movement of the bushing 125 so that when tubing T is forced onto pin 119, it will engage and retract bushing 125 against spring 126 as seen in FIG. 16. As soon as the tubing T is released the bushing 125, under the force of spring 126, will eject the tubing from pin 119.

Figure 15:
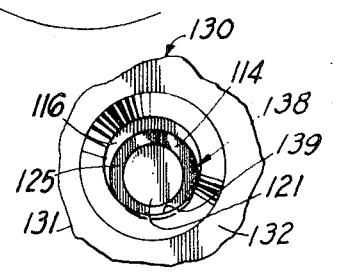
FIG. 15 is an enlarged plan view illustrating the cutting edge of the tool of FIG. 13.

A scoring assembly 130 is carried on the reduced diameter portion 112 of housing 111 to circumferentially score the tubing T carried on pin 119 as seen in FIGS. 14 - 16. The scoring assembly 130 includes a cap 131 with a central front plate 132 and a side flange 134 integral with the circumference of plate 132 and extending therefrom so that when the inside of plate 132 rests against the end surface 122 of housing 111, the flange 130 extends over the reduced diameter portion 112. The recess 135 defined by plate 132 and flange 134 has a diameter larger than the outside of the portion 112 and is held onto the portion 112 by a retaining ring 136 so that the inside of plate 132 is in juxtaposition with surface 122. A centrally located hole 138 extends through plate 132 and that portion of plate 132 adjacent hole 138 is tapered to form a sharp edge 139 about hole 138. The hole 138 is of such diameter that when cap 131 is moved about on portion 112 portions of the sharp edge 139 can be made to extend slightly over passage 114 as seen in FIG. 15. In this manner, the edge 139 can be made to circumferentially score the tubing T in line with surface 122 by manually moving cap 131.

When plain tubing T is measured to length and inserted over support member 16 of primary tool 10, the primary tool 10 is used to insert the free open end of the tubing over pin 119 and through passage 114 to depress bushing 125 against spring 126 until the end 17 of member 16 abuts end 121 of pin 119 as seen in FIG. 16. The cap 131 is then rotated while the tubing T is held in this position to circumferentially score the tubing and form a weakened portion. Then the tools 10 and 110 are pivoted about the ends 17 and 121 to sever the tubing T about the thusly formed narrow scored area.

It will be noted that the plain tubing T may be severed without scoring same where the smoothness of the severed end of the tubing is not critical. This can be accomplished using tools 10 and 110 since since the pins 119 and member 16 support the inside of the tubing T while the lip 116 supports the outside thereof adjacen the path along which the tubing is to be severed.

Figure 17:
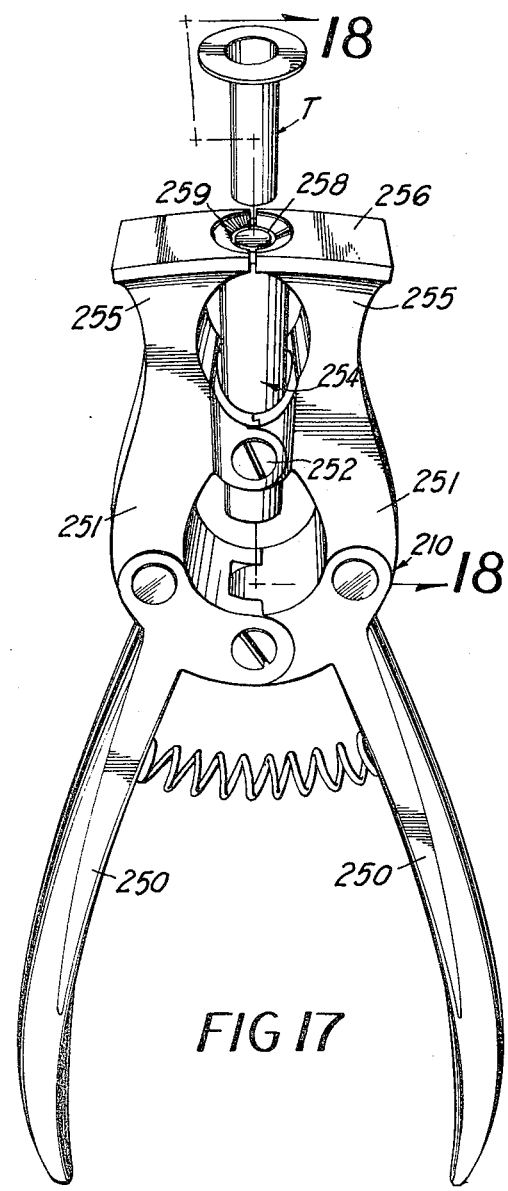
FIG. 17 is an elevational view of a second embodiment of a combined support and scoring tool of the invention.
Figure 18:
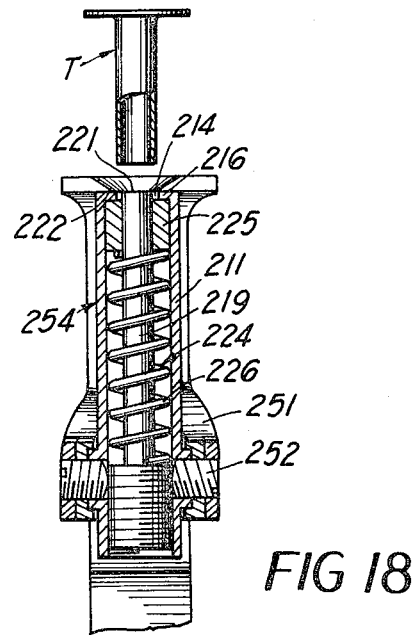
FIG. 18 is a partial cross sectional view of the tool of FIG. 17.

Another secondary tool 210 is illustrated in FIGS. 17 and 18. The tool 210 is a modification of a pair of tile cutters and includes a pair of handles 250 pivotally connected to a pair of links 251 pinned together at 252. A support and ejector assembly 254 is carried at the pivot 252 and extends therefrom centrally located between the working ends 255 of links 251 as best seen in FIG. 18. The assembly 254 is similar in construction to housing 111, pin 119 and ejector 124 in tool 110 with a housing 211 defining a first passage 214 extending therein from the working end surface 222 of housing 211 and a chamber 215 connected with passage 214 to form a lip 216 around passage 214. A support pin 219 is carried by housing 211 and centrally extends through chamber 215 and passage 214 with its working end 221 flush with surface 222. Since the pin 219 conforms to the inside of tubing T and the lip 216 conforms to the outside of the tubing the tubing may be slipped onto pin 219 through passage 214 to be supported externally and internally as with tool 110.

An ejector 224 is carried on pin 219 and includes a bushing 225 slidably carried on pin 119 and urged toward lip 216 by spring 226. The function of ejector 224 is the same as that of ejector assembly 124 in tool 110.

A scoring blade 256 is carried by the working end 255 of each of the links 251 so that the blades 256 are juxtaposed on surface 222 of housing 211. Each blade 256 defines a semicircular opening 258 therein having a radius slightly less than the the outside radius of the tubing T to be inserted in housing 211. The blades 256 are tapered adjacent the openings 258 to form cutting edges 259 about the openings 258. Since the housing 211 is centrally located between blades 256, the edges 259 circumferentially score the tubing T in a manner similar to that of tool 110. The tool 210 is used in the same manner as tool 110.

Figure 19:
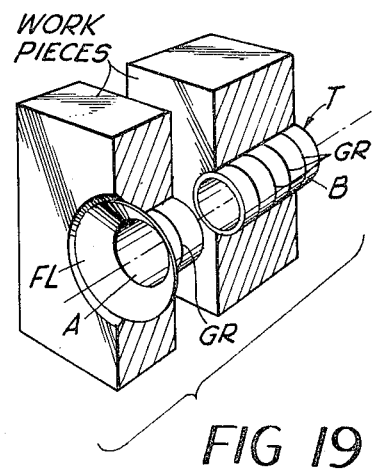
FIGS. 19 – 22 illustrate the method of installing a thin walled fastener adapter.
Figure 20:
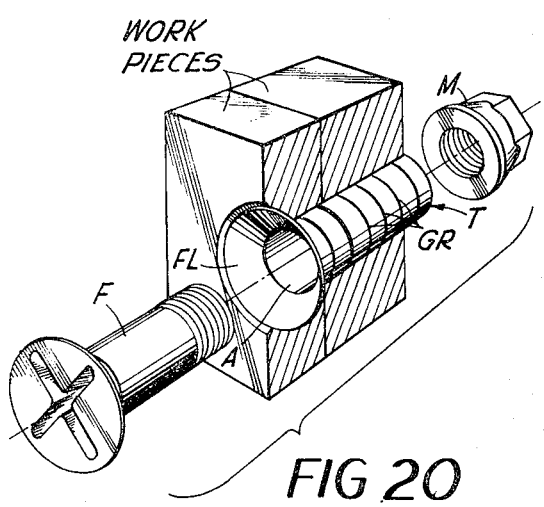

Referring to FIGS. 19 and 20, it will be seen that a thin walled tubing fastener adapter T can be installed in work pieces by first severing the tubing T to length and then severing the thusly formed tubing again to form sections A and B where section A is substantially equal in length to the thickness of one of the work pieces and section B is substantially equal in length to the thickness of the other work piece. When the segmented adapter T is placed in the work pieces, usually with a bonding agent to hold the adapter sections in place, a fastener F may be placed therethrough and locked in place by a gripping member M in conventional manner. When the fastener F is removed, the work pieces may be separated while the adapter sections A and B are retained in the work pieces.

Figure 21:
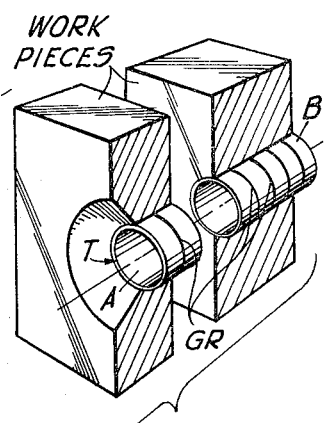
Figure 22:
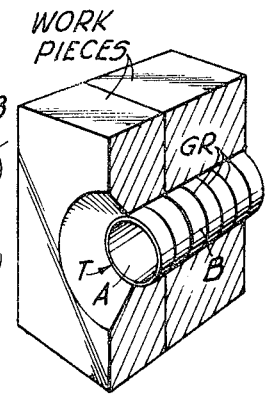

Likewise, FIGS. 21 and 22 illustrate the use of tubing T to make an adapter without a flange to enlarge the diameter of a fastener in the same manner as illustrated in FIGS. 19 and 20.

It is to be further understood that a different size tool 10 and tool 11, 110 or 210 will be used for each different size of tubing T. Each set of tools 10 and 11, 110 or 210 can be color coded for size.

While specific embodiments of the invention have been described herein, it is to be understood that modifications, equivalents and substitutions may be used without departing from the scope of the invention.

I claim:

1. A method of severing thin walled tubing to length for placing around the bearing surface of a fastener comprising the steps of:
   a. internally supporting the tubing from one end thereof to a position such that the length of tubing supported is substantially equal to the length of the bearing surface of the fastener;
   b. internally supporting the tubing from the opposite end thereof to a position such that the tubing is supported along its length;
   c. externally scoring the tubing circumferentially in a plane perpendicular to the longitudinal axis of the tubing at that point along the tubing from said one end substantially equal to the length of the bearing surface of the fastener to form a circumferentially extending weakened portion therein;
   d. applying radially outwardly directed forces from within the tubing through said weakened portion; and,
   e. applying oppositely and longitudinally directed forces through said weakened portion to cause the tubing to sever along said weakened portion.

2. The method of claim 1 wherein step (a) includes inserting a first support member into said tubing from said one end thereof so that the end thereof is located from said one end of said tubing the distance substantially equal to the length of the bearing surface of the fastener; wherein step (b) includes inserting a second support member into said tubing from the opposite end thereof to abut the end of said first support member; and, wherein steps (d) and (e) are performed simultaneously by pivoting said support members about their abutting ends.

3. A method of severing thin walled tubing which has a circumferentially extending weakened portion therearound to length comprising the steps of:
   a. inserting a first support member into the end of said tubing from one end thereof so that the end of said member is in alignment with said weakened portion, said support member conforming in outside configuration to the inside configuration of said tubing to support same adjacent said weakened portion;
   b. inserting a second support member into said tubing from the opposite end thereof until the end of said second member abuts the end of said first member, said second support member conforming in outside configuration to the inside configuration of said tubing to support same adjacent said weakened portion; and,
   c. pivoting said first and second support members about their abutting ends to sever said tubing along said weakened portions.

4. The method of claim 3 wherein step (c) is performed by moving the ends of said first and second members projecting from said tubing in a first radial direction and then in a second radial direction opposite to said first radial direction.

5. A method of severing thin walled tubing to length for placing around the bearing surface of a fastener and wherein the tubing has at least one external circumferentially extending weakened portion therein perpendicular to the longitudinal axis of the tubing a distance from one end of the tubing substantially equal to the length of the bearing surface of the fastener comprising the steps of:
   a. inserting a first support member into said tubing from one end thereof until the inserted end of said support member is in alignment with said weakened portion, said first support member having an outside configuration conforming to the internal configuration of said tubing to support same adjacent said weakened portion;
   b. inserting a second support member into said tubing from the of said end of said tubing until the inserted end of said second support member abuts the inserted end ofd first support member; and,
   c. pivoting said first and second support members about their abutting ends to exert both radially outwardly directed forces and oppositely and longitudinally directed forces through said weakened portion to cause said tubing to sever along said weakened portion.

6. Apparatus for severing thin walled tubing having at least one circumferentially extending narrow weakened portion therearound including a first support member slidably receivable into the tubing from one end thereof having an external configuration conforming to the internal configuration of the tubing;

positioning means including a stop member slidably carried by said first support member and a locking means for selectively locking said stop member onto said support member at a selected position so that when said tubing is positioned on said first support member so that one end of said tubing abuts said stop member, the projecting end of said first support member lies substantially in alignment with the weakened portion of the tubing; and, a second support member slidably receivable into the end of the tubing opposite the one end so that one end of said second support member lies in juxtaposition with said one end of said first support member whereby said first and second support members lie along a common axis, said second support member having an external configuration conforming to the internal configuration of the tubing to cause the weakened portion of the tubing to be severed as said support members are pivoted from their common axis about their said juxtaposed ends.

7. Apparatus for adjusting the length of thin walled tubing to cover the bearing area of a fastener which also has a gripping area including:

a stop member defining a measuring surface, a first passage therethrough opening onto said measuring surface, and a second passage therethrough opening onto said measuring surface and displaced laterally from said first passage for slidably receiving the gripping area of the fastener therein;

a support member slidably received through said first passage having an external configuration conforming to the major portion of the external configuration of the bearing area of the fastener; and, check means adjustably received in said second passage for selectively positioning the fastener in said second passage so that the bearing area of the fastener is exposed beginning at said measuring surface and extending therefrom for the length of said support member extending from said measuring surface to be visually adjusted to the length of the bearing area of the fastener and for the tubing to be inserted over said adjusted exposed portion of said support member so that said support member internally supports a length of the tubing corresponding to the length of the bearing area of the fastener.

8. The apparatus of claim 7 for also adjusting the length of the tubing to cover the bearing area of the inside of holes through a plurality of workpieces in which the fastener is to be installed and further including a diametrically extending slot across said measuring surface;

a check member defining an adjusting surface and a gaging passage therethrough opening onto said adjusting surface; and, a gaging member movably received through said gaging passage and extendable over said adjusting surface, said gaging member including a pin portion receivable through the holes in the workpieces, a lug portion on the projecting end of said pin portion and having a width such that said lug portion is slidably receivable in said slot across said measuring surface of said stop member and a pair of shoulders on opposite sides of said lug portion having a width wider than said slot and aligned with the gaging surface of said lug portion facing said adjusting surface of said check member so that said lug portion can be extended through said holes to measure the thickness of the workpieces between the gaging surface and the adjusting surface and this thickness measurement can be transferred to said stop member and said support member by placing said lug portion in said slot until said shoulders abut said support member with respect to said stop member until the protruding end of said support member abuts said adjusting surface.

9. Apparatus for severing thin walled tubing to length comprising:

support means for internally supporting the tubing in the vicinity of that path along which the tubing is to be severed, said support means including:

a first tool comprising a support member slidably receivable in the tubing and having an external configuration corresponding to the internal configuration of the tubing and a stop slidably carried by said support member for adjustably positioning the tubing on said support member;

a second tool comprising a support pin slidably receivable in the tubing to abut that end of said support member extending into the tubing and having an external configuration conforming to the internal configuration of the tubing, and a housing means carried by said support pin; and, path, scoring means for externally scoring the tubing along a path in alignment with the abutting ends of said support member and said support pin at which the tubing is to be severed so that, as said support member and said support pin are moved relative to each other, the tubing will sever along said path said scoring means being carried by said housing means.

10. Apparatus as set forth in claim 9 wherein said housing means defines a support shoulder for externally supporting the tubing adjacent said path along which the tubing is scored.

11. Apparatus as set forth in claim 10 wherein said housing means defines a chamber therein into which the tubing extends and wherein said second tool further includes ejector means for ejecting the tubing therefrom.

12. Apparatus as set forth in claim 9 wherein said scoring means includes a cutting member having a sharpened edge, said cutting member movable circumferentially about said tubing positioned on said support means with said sharpened edge scoring said tubing in the plane of the extending end of said support pin.

13. Apparatus as set forth in claim 12 wherein said housing means includes a cylindrical housing member defining a centrally located longitudinally extending chamber therein and an annular retaining lip extending into said chamber at one end of said housing member, said support pin adjustably positioned in said chamber and concentrically within the cylindrical opening defined by said retaining lip and including a stud portion closing that end of said chamber, the diameter of said opening defined by said retaining lip conforming to the external configuration of said tubing so that said tubing may be slid over said support pin and through said opening into said chamber and the projecting end of said support pin lying in the plane of the outside surface of said retaining lip, said housing member defining a reduced diameter portion at that end adjacent said retaining lip and concentric with respect to said opening defined by said lip;

wherein said cutting member of said scoring means includes a cap defining a recess therein larger than the reduced diameter portion of said housing member and having a central front plate adapted to be positioned in juxtaposition with the outside surface of said retaining lip on said housing member so that said cap extends rearwardly over said reduced diameter portion of said housing member, said central front plate defining a central hole therethrough larger in diameter than said opening defined by said retaining flange and being tapered adjacent said central hole to define said cutting edge in juxtaposition with the outside surface of said retaining lip, said scoring means further including means for retaining said cap on said reduced diameter portion and allowing portions of said cutting edge to be selectively movable partially over said opening defined by said retaining lip to score said tubing; and, further including ejector means for ejecting the tubing from within said chamber in said housing member, said ejector means including a bushing slidably carried within said chamber by said support pin between said stud portion of said pin and said retaining lip and a spring positioned between said bushing and said stud portion to constantly urge said bushing toward said retaining lip.

14. Apparatus as set forth in claim 9 wherein said housing means includes a pair of links pivotally connected to each other and handle means for selectively pivoting said links toward each other, said support pin pivotally mounted with respect to said links and projecting between the projecting ends of said links, and including a scoring blade carried by said projecting end of each of said links, said scoring blades movable toward each other as said links are pivoted to abut along their adjacent edges in juxtaposition with the projecting end of said support pin, each of said blades having a semi-circular opening therein aligned with the other said semicircular opening to define a circular opening between said blades a prescribed amount less than the external diameter of said tubing and being tapered about said semi-circular opening to define a sharpened edge in juxtaposition with the projecting end of said support pin to score said tubing carried by said support pin when said adjacent edges of said scoring blades abut.

15. Apparatus as set forth in claim 14 further including ejection means for selectively ejecting said tubing from said support pin.

16. Apparatus for adjusting the length of thin walled tubing to cover the bearing area of the inside of holes through a plurality of workpieces and of a fastener to be inserted through the holes including:

a stop member defining a measuring surface, a passage therethrough opening onto said measuring surface and a diametrically extending slot across said measuring surface;

a support member movably received through said passage in said stop member and having an external configuration conforming to the external configuration of the bearing area of said fastener and the internal configuration of said tubing;

a check member defining an adjusting surface and a gaging passage therethrough opening onto said adjusting surface; and, a gaging member movably received through said gaging passage and extendable over said adjusting surface, said gaging member including a pin portion receivable through the holes in the workpieces, a lug portion on the projecting end of said pin portion and having a width such that said lug portion is slidably receivable in said slot across said measuring surface of said stop member, and a pair of shoulders on opposite sides of said lug portions having a width wider than said slot and aligned with the gaging surface of said lug portion facing said adjusting surface of said check member so that said lug portion can be extended through said holes to measure the thickness of the workpieces between the gaging surface and the adjusting surface and this thickness measurement can be transferred to said stop member and said support member by placing said lug portion in said slot until said shoulders abut said measuring surface and moving said support member with respect to said stop member until the protruding end of said support member abuts said adjusting surface.

* * * * *